(12) United States Patent
Feng

(10) Patent No.: US 11,134,512 B2
(45) Date of Patent: Sep. 28, 2021

(54) SCHEDULING DEVICE, SCHEDULED DEVICE, AND RESOURCE SCHEDULING METHOD AND APPARATUS

(71) Applicant: Huawei Technologies Co., Ltd., Shenzhen (CN)

(72) Inventor: Shulan Feng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/991,587

(22) Filed: May 29, 2018

(65) Prior Publication Data

US 2018/0279356 A1 Sep. 27, 2018

Related U.S. Application Data

(63) Continuation of application No. PCT/CN2015/095966, filed on Nov. 30, 2015.

(51) Int. Cl.
*H04W 72/12* (2009.01)
*H04W 72/04* (2009.01)
(Continued)

(52) U.S. Cl.
CPC ....... *H04W 72/1289* (2013.01); *H04L 5/0053* (2013.01); *H04W 52/02* (2013.01);
(Continued)

(58) Field of Classification Search
CPC ............. H04W 72/1289; H04W 52/02; H04W 72/1257; H04W 72/042; H04W 72/12;
(Continued)

(56) References Cited

U.S. PATENT DOCUMENTS 9,351,287 B2 * 5/2016 Lan .................. H04L 5/003
9,674,835 B2 * 6/2017 Kim .................. H04L 5/001
(Continued)

FOREIGN PATENT DOCUMENTS

| CN | 101448332 A | 6/2009 |
| CN | 102378384 A | 3/2012 |

(Continued)

OTHER PUBLICATIONS

3rd Generation Partnership Project; Technical Specification Group Radio Access Network; Evolved Universal Terrestrial Radio Access (E-UTRA); Physical channels and modulation (Release 12), Technical Specification, 3GPP TS 36.211 V12.7.0 (Sep. 2015), 136 pages.
(Continued)

*Primary Examiner* — Jay P Patel
(74) *Attorney, Agent, or Firm* — Slater Matsil, LLP

(57) ABSTRACT

Embodiments of the present invention provide a resource scheduling method. The method includes: receiving, by a scheduled device, pre-scheduling information and dynamic scheduling information sent by a scheduling device, and when the pre-scheduling information indicates that the scheduling device allocates a radio resource to the scheduled device in a pre-scheduling resource range, performing data reception or sending or control signaling detection on the radio resource indicated by the pre-scheduling information; and when the dynamic scheduling information indicates that the scheduling device allocates a radio resource to the scheduled device in a dynamic scheduling resource range, performing control signaling detection on a resource in the dynamic scheduling resource range.

20 Claims, 7 Drawing Sheets

(51) Int. Cl.
  *H04W 52/02* (2009.01)
  *H04L 5/00* (2006.01)
  *H04L 1/00* (2006.01)
(52) U.S. Cl.
  CPC ..... *H04W 72/042* (2013.01); *H04W 72/1257* (2013.01); *H04L 1/0038* (2013.01); *Y02D 30/70* (2020.08)
(58) Field of Classification Search
  CPC ... H04L 5/0053; H04L 1/0038; Y02D 70/162; Y02D 70/1262; Y02D 70/142; Y02D 70/126
  See application file for complete search history.

(56) References Cited

U.S. PATENT DOCUMENTS

| | | | |
|---|---|---|---|
| 10,021,677 B2 * | 7/2018 | Mallik | H04L 1/1861 |
| 10,645,670 B2 * | 5/2020 | Tie | H04W 68/025 |
| 2002/0126675 A1 * | 9/2002 | Yoshimura | H04L 47/14 370/395.21 |
| 2007/0298825 A1 * | 12/2007 | Kayama | H04W 28/22 455/522 |
| 2008/0233941 A1 * | 9/2008 | Jen | H04W 74/002 455/418 |
| 2009/0122754 A1 | 5/2009 | Kang et al. | |
| 2010/0113004 A1 * | 5/2010 | Cave | H04W 72/0406 455/422.1 |
| 2010/0157895 A1 * | 6/2010 | Pani | H04L 5/0044 370/328 |
| 2010/0329188 A1 * | 12/2010 | Jen | H04B 7/2606 370/328 |
| 2011/0243056 A1 * | 10/2011 | Jen | H04L 5/0051 370/312 |
| 2012/0250625 A1 * | 10/2012 | Kim | H04L 5/0096 370/328 |
| 2013/0094383 A1 | 4/2013 | Lin | |
| 2013/0142134 A1 * | 6/2013 | Zhu | H04L 5/0082 370/329 |
| 2013/0148638 A1 | 6/2013 | Xing et al. | |
| 2013/0176970 A1 | 7/2013 | Terry et al. | |
| 2013/0294247 A1 * | 11/2013 | Zhu | H04W 72/0486 370/235 |
| 2014/0119266 A1 * | 5/2014 | Ng | H04L 27/2602 370/312 |
| 2014/0126492 A1 | 5/2014 | Gleixner et al. | |
| 2015/0063277 A1 | 3/2015 | Yamada et al. | |
| 2015/0092728 A1 * | 4/2015 | Wang | H04L 5/0048 370/329 |
| 2015/0146677 A1 | 5/2015 | Ito | |
| 2015/0148074 A1 * | 5/2015 | Phan | H04W 4/021 455/456.3 |
| 2015/0156669 A1 * | 6/2015 | Quan | H04L 69/321 370/216 |
| 2015/0200762 A1 * | 7/2015 | Kim | H04L 1/0027 370/329 |
| 2015/0334722 A1 | 11/2015 | Chen et al. | |
| 2016/0037511 A1 * | 2/2016 | Vincze | H04B 7/0626 370/329 |
| 2016/0057781 A1 * | 2/2016 | McHenry | H04B 7/0647 370/329 |
| 2016/0192335 A1 | 6/2016 | Kusashima et al. | |
| 2016/0262188 A1 * | 9/2016 | Zhang | H04W 74/0808 |
| 2016/0353473 A1 * | 12/2016 | Chen | H04W 72/1273 |
| 2016/0366682 A1 * | 12/2016 | Tseng | H04W 72/0446 |
| 2017/0079054 A1 * | 3/2017 | Yan | H04W 72/046 |
| 2017/0099674 A1 * | 4/2017 | Han | H04W 72/0406 |
| 2017/0135101 A1 * | 5/2017 | Li | H04L 5/14 |
| 2017/0142737 A1 * | 5/2017 | Zheng | H04W 72/0446 |
| 2017/0149543 A1 * | 5/2017 | Ang | H04L 5/0053 |
| 2017/0150486 A1 * | 5/2017 | Ang | H04L 5/0044 |
| 2018/0048412 A1 * | 2/2018 | Zhang | H04W 74/006 |
| 2018/0124829 A1 * | 5/2018 | Lee | H04W 72/1205 |
| 2018/0152962 A1 * | 5/2018 | Lee | H04L 5/1469 |
| 2018/0206206 A1 * | 7/2018 | Tie | H04W 4/70 |
| 2018/0213457 A1 * | 7/2018 | Tang | H04W 36/0072 |
| 2018/0263062 A1 * | 9/2018 | Lee | H04W 72/1284 |
| 2020/0126675 A1 * | 4/2020 | Park | G06F 16/3329 |
| 2020/0236650 A1 * | 7/2020 | Tie | H04W 4/70 |

FOREIGN PATENT DOCUMENTS

| | | | |
|---|---|---|---|
| CN | 103298130 A | 9/2013 | |
| CN | 103916913 A | 7/2014 | |
| CN | 104581970 A | 4/2015 | |
| CN | 104584659 A | 4/2015 | |
| CN | 104812071 A | 7/2015 | |
| EP | 1763268 A1 | 3/2007 | |
| EP | 2106057 A1 * | 9/2009 | .......... H04L 5/0094 |
| EP | 2255484 A2 | 12/2010 | |
| JP | 2009296589 A | 12/2009 | |
| KR | 20140015843 A | 2/2014 | |
| WO | 2008117227 A2 | 10/2008 | |
| WO | 2009022855 A2 | 2/2009 | |
| WO | 2009115904 A2 | 9/2009 | |
| WO | 2009131037 A1 | 10/2009 | |
| WO | 2015000917 A2 | 1/2015 | |
| WO | 2015020108 A1 | 2/2015 | |

OTHER PUBLICATIONS

3rd Generation Partnership Project; Technical Specification Group Radio Access Network; Evolved Universal Terrestrial Radio Access (E-UTRA); Physical layer procedures (Release 12), Technical Specification, 3GPP TS 36.213 V12.7.0 (Sep. 2015), 241 pages.

IEEE Standard for Information technology—Telecommunications and information exchange between systems—Local and metropolitan area networks—Specific requirements Part 11: Wireless LAN Medium Access Control (MAC) and Physical Layer (PHY) Specifications, IEEE Std 802.11™—2007, Jun. 12, 2007, 1232 pages.

IEEE Standard for Information technology—Telecommunications and information exchange between systems—Local and metropolitan area networks—Specific requirements Part 15.4: Wireless Medium Access Control (MAC) and Physical Layer (PHY) Specifications for Low-Rate Wireless Personal Area Networks (WPANs), IEEE Std 802.15.4™—2006, Sep. 8, 2006, 323 pages.

Motorola Mobility, "Introduction of LAA (PHY layer aspects)," 3GPP TSG-RAN WG1#83 R1-157893, Anaheim, CA, USA, Nov. 15-22, 2015, 5 pages.

Huawei et al., "Overview of resource allocation mechanism for V2V", 3GPP TSG-RAN WG1#82b, R1-155662, Oct. 9, 2015, 3 pages.

Catt et al., "Analysis on resource efficiency of uplink access solutions", 3GPP TSG RAN WG2 Meeting #91 bis, R2-154122, Oct. 5-9, 2015, 7 pages, Malm, Sweden.

Huawei, "Text Proposal capturing outcome of email discussion: [91 bis#34][LTE/LATRED] CB-PUSCH", 3GPP TSG-RAN WG2#92, R2-156300, Nov. 16-20, 2015, 9 pages, Anaheim, USA.

* cited by examiner

CONT.
FROM
FIG. 2A-1

S206. When the pre-scheduling information indicates that the scheduling device allocates a radio resource to the scheduled device in the pre-scheduling resource range, the scheduled device performs data reception or sending on the radio resource indicated by the pre-scheduling information S207. When the dynamic scheduling information indicates that the scheduling device allocates a radio resource used for communication to the scheduled device in the dynamic scheduling resource range, the scheduled device performs control signaling detection in each subframe in the dynamic scheduling resource range S208. When the pre-scheduling information indicates that the scheduling device does not allocate a radio resource to the scheduled device in the pre-scheduling resource range, and the dynamic scheduling information indicates that the scheduling device does not allocate a radio resource to the scheduled device in the dynamic scheduling resource range, the scheduled device enters a sleep mode

FIG. 2A-2

SCHEDULING DEVICE, SCHEDULED DEVICE, AND RESOURCE SCHEDULING METHOD AND APPARATUS

CROSS-REFERENCE TO RELATED APPLICATIONS

This application is a continuation of international application No. PCT/CN2015/095966, filed on Nov. 30, 2015, the disclosure of which is hereby incorporated by reference in its entirety.

TECHNICAL FIELD

The present invention relates to the field of wireless communications technologies, and in particular, to a scheduling device, a scheduled device, and a resource scheduling method and apparatus.

BACKGROUND

In a wireless cellular network, a scheduling device determines, by using a scheduling mechanism, resources used by a scheduled device to perform data communication.

In a conventional resource scheduling mechanism, a scheduling device (for example, a base station, a wireless access point, and a relay node, which are collectively referred to as scheduling devices below) updates a resource scheduling result once in each scheduling period, and notifies a scheduled device, for example, a user equipment (UE) and a mobile station (MS), of the scheduling result. For example, in a long term evolution (LTE) system, the scheduling device is a base station and the scheduled device is user equipment UE. The base station updates a scheduling result once every 1 ms, and the base station sends, to the UE by using a physical downlink control channel (PDCCH), scheduling information used to indicate a radio resource used by the UE to receive or send data. In each dynamic scheduling period (usually one subframe, that is, 1 ms), the UE in a connected state constantly performs blind detection on a PDCCH delivered by the base station, to obtain radio resource scheduling information. Typically, in one dynamic scheduling period (one subframe, that is, 1 ms), the UE performs blind detection on one carrier for 32 times.

A current system has the following disadvantages. In the conventional resource scheduling mechanism, the UE needs to perform PDCCH blind detection in each subframe, and therefore, power consumption is relatively large, and a battery life of the scheduled device is affected.

SUMMARY

To resolve a problem that a scheduled device performs PDCCH blind detection in each subframe, and therefore, power consumption is relatively large, and a battery life of the scheduled device is affected, this application provides a scheduling device, a scheduled device, and a resource scheduling method and apparatus.

According to a first aspect, embodiments of the present invention provide a resource scheduling method. The method includes receiving, by a scheduled device, scheduling indication information sent by a scheduling device, where the scheduling indication information includes pre-scheduling information and dynamic scheduling information. The method also includes performing, by the scheduled device when the pre-scheduling information indicates that the scheduling device allocates a radio resource to the scheduled device in a pre-scheduling resource range, data reception or sending or control signaling detection on the radio resource indicated by the pre-scheduling information. The method also includes, when the dynamic scheduling information indicates that the scheduling device allocates a radio resource to the scheduled device in a dynamic scheduling resource range, performing, by the scheduled device, data reception or sending or control signaling detection on a resource in the dynamic scheduling resource range. The radio resource indicated by the pre-scheduling information is a time-frequency resource in the pre-scheduling resource range, and the pre-scheduling resource range is all or a part of an available time-frequency resource range in at least one scheduling period. The dynamic scheduling resource range is all or a part of a resource range, other than the pre-scheduling resource range, included in the available time-frequency resource range in the at least one scheduling period. That is, the scheduled device does not need to perform control signaling detection on all resources, so that power consumption of the scheduled device is reduced, and a battery life of the scheduled device is increased.

In a first possible implementation of the first aspect, the method further includes: when the pre-scheduling information indicates that the scheduling device does not allocate a radio resource to the scheduled device in the pre-scheduling resource range, skipping performing, by the scheduled device, data reception or sending or control signaling detection in the pre-scheduling resource range; and when the dynamic scheduling information indicates that the scheduling device does not allocate a radio resource to the scheduled device in the dynamic scheduling resource range, skipping performing, by the scheduled device, data reception or sending or control signaling detection in the dynamic scheduling resource range. The radio resource indicated by the pre-scheduling information is a time-frequency resource in the pre-scheduling resource range, and the pre-scheduling resource range is all or a part of the available time-frequency resource range in the at least one scheduling period; and the dynamic scheduling resource range is all or a part of a resource range, other than the pre-scheduling resource range, included in the available time-frequency resource range in the at least one scheduling period. That is, when the pre-scheduling information or the dynamic scheduling information indicates that the scheduling device does not allocate a radio resource to the scheduled device in the pre-scheduling resource range or the dynamic scheduling resource range, the scheduled device performs control signaling detection on none of resources in a corresponding resource range, so that power consumption of the scheduled device is further reduced, and a battery life of the scheduled device is increased.

In a second possible implementation of the first aspect, the method further includes: when the pre-scheduling information indicates that the scheduling device does not allocate a radio resource to the scheduled device in the pre-scheduling resource range, and the dynamic scheduling information indicates that the scheduling device does not allocate a radio resource to the scheduled device in the dynamic scheduling resource range, entering, by the scheduled device, a sleep mode. That is, when the scheduled device needs to perform data transmission in neither the pre-scheduling resource range nor the dynamic scheduling resource range, the scheduled device may directly enter the sleep mode, so that power consumption of the scheduled device is further reduced.

According to a second aspect, embodiments of the present invention provide a resource scheduling method. The method includes: generating, by a scheduling device, scheduling indication information, where the scheduling indication information includes pre-scheduling information. The method also includes sending, by the scheduling device, the scheduling indication information to a scheduled device, so that when the pre-scheduling information indicates that the scheduling device allocates a radio resource to the scheduled device in a pre-scheduling resource range, the scheduled device performs data reception or sending or control signaling detection on the radio resource indicated by the pre-scheduling information, and when a dynamic scheduling information indicates that the scheduling device allocates a radio resource to the scheduled device in a dynamic scheduling resource range, the scheduled device performs data reception or sending or control signaling detection on a resource in the dynamic scheduling resource range. The radio resource indicated by the pre-scheduling information is a time-frequency resource in the pre-scheduling resource range, and the pre-scheduling resource range is all or a part of an available time-frequency resource range in at least one scheduling period. The dynamic scheduling resource range is a part of a resource range, other than the pre-scheduling resource range, included in the available time-frequency resource range in the at least one scheduling period.

According to a third aspect, embodiments of the present invention further provide a scheduled device, and the scheduled device includes: a memory, a transceiver, and a processor connected to the memory and the transceiver. The memory is configured to store an instruction, and the processor is configured to execute the instruction stored in the memory; and when executing the instruction stored in the memory, the processor may implement the resource scheduling method provided in the first aspect or various possible implementations of the first aspect.

According to a fourth aspect, embodiments of the present invention further provide a scheduling device. The scheduling device includes: a memory, a transceiver, and a processor connected to the memory and the transceiver. The memory is configured to store an instruction, and the processor is configured to execute the instruction stored in the memory; and when executing the instruction stored in the memory, the processor may implement the resource scheduling method provided in the second aspect or various possible implementations of the second aspect.

According to a fifth aspect, this application provides a resource scheduling apparatus applied to a scheduled device, the apparatus includes some units, and the some units are configured to execute the resource scheduling method provided in the first aspect or various possible implementations of the first aspect.

According to a sixth aspect, this application provides a resource scheduling apparatus applied to a scheduling device, the apparatus includes some units, and the some units are configured to execute the resource scheduling method provided in the second aspect or various possible implementations of the second aspect.

In addition, the performing, by the scheduled device when the pre-scheduling information indicates that the scheduling device allocates a radio resource to the scheduled device in a pre-scheduling resource range, data reception or sending or control signaling detection on the radio resource indicated by the pre-scheduling information includes: performing, by the scheduled device, data reception or sending on the radio resource indicated by the pre-scheduling information.

The performing, by the scheduled device when the pre-scheduling information indicates that the scheduling device allocates a radio resource to the scheduled device in a pre-scheduling resource range, data reception or sending or control signaling detection on the radio resource indicated by the pre-scheduling information includes: performing, by the scheduled device, control signaling detection on a scheduling resource indicated by the pre-scheduling information, to obtain the radio resource, and performing, by the scheduled device, data reception or sending on the radio resource, where the scheduling resource is a time-frequency resource in the pre-scheduling resource range.

The sending, by the scheduling device, the scheduling indication information to a scheduled device and the receiving, by a scheduled device, scheduling indication information sent by a scheduling device include: sending, by the scheduling device, the scheduling indication information by using a subframe preceding the at least one scheduling period, and receiving, by the scheduled device, the scheduling indication information carried by the subframe preceding the at least one scheduling period; or sending, by the scheduling device, the scheduling indication information by using a subframe in the pre-scheduling resource range, and receiving, by the scheduled device, the scheduling indication information in the pre-scheduling resource range; or sending, by the scheduling device, the scheduling indication information by using a specified data packet, and receiving, by the scheduled device, the scheduling indication information carried by the specified data packet; or sending, by the scheduling device, the scheduling indication information by using a specified PDCCH of a specified subframe in the pre-scheduling resource range, and receiving, by the scheduled device, the scheduling indication information carried by the specified physical downlink control channel (PDCCH) of the specified subframe in the pre-scheduling resource range; or sending, by the scheduling device, channel indication information by using a specified PDCCH of a specified subframe in the pre-scheduling resource range, sending the scheduling indication information by using a physical downlink shared channel (PDSCH) indicated by the channel indication information, receiving, by the scheduled device, the channel indication information carried by the specified PDCCH of the specified subframe in the pre-scheduling resource range, and receiving the scheduling indication information carried by the physical downlink shared channel PDSCH indicated by the channel indication information.

The generating, by a scheduling device, scheduling indication information includes: generating the scheduling indication information according to at least one of the following information: a quantity of scheduled devices accessing the scheduling device, types of the scheduled devices, service types of the scheduled devices, sizes of service volumes of the scheduled devices, or service transmission periods of the scheduled devices.

Embodiments of the present invention further include generating, by the scheduling device, resource range allocation information according to information about scheduled devices accessing the scheduling device, where the resource range allocation information is used to indicate the pre-scheduling resource range and the dynamic scheduling resource range in the at least one scheduling period, and sending, by the scheduling device, the resource range allocation information to the scheduled device; and receiving, by the scheduled device, the resource range allocation information sent by the scheduling device, and determining the pre-scheduling resource range and the dynamic scheduling resource range in the at least one scheduling period according to the resource range allocation information, where the information about scheduled devices accessing the scheduling device includes at least one of the following:

a quantity of scheduled devices, types of the scheduled devices, service types of the scheduled devices, sizes of service volumes of the scheduled devices, or service transmission periods of the scheduled devices. That is, the scheduling device specifies, for each scheduling device according to related information such as a quantity, types, and services of scheduled devices accessing the scheduling device, a resource used for communication or control signaling detection, divides a resource range for each scheduled device, and comprehensively considers actual service usage of each scheduled device, so as to optimize resource usage efficiency of each scheduled device, and improve an overall scheduling effect of each scheduled device.

The subframe in the present invention is a minimum time for performing resource allocation update for the scheduled device, and is a shortest dynamic scheduling period of the scheduled device. In an example of LTE, one subframe is 1 millisecond. In the present invention, a minimum dynamic scheduling unit is not limited to one subframe, and may be a shorter time, for example, one orthogonal frequency division multiplexing (OFDM) symbol or one timeslot, or may be or a longer time, for example, a plurality of subframes or one radio frame or a plurality of radio frames.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 2A-1 and FIG. 2A-2 are a flowchart of a resource scheduling method according to an embodiment of the present invention;

DETAILED DESCRIPTION OF ILLUSTRATIVE EMBODIMENTS

To make the objectives, technical solutions, and advantages of the present invention clearer, the following further describes the embodiments of the present invention in detail with reference to the accompanying drawings.

Figure 1:
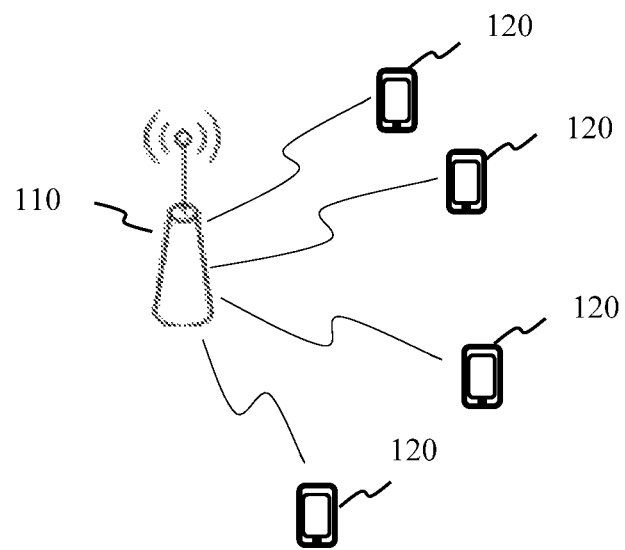
FIG. 1 is an architectural diagram of a network environment according to embodiments of the present invention.

Referring to FIG. 1, FIG. 1 is an architectural diagram of a network environment according to embodiments of the present invention. The network environment includes the following network devices: a scheduling device 110 and at least one scheduled device 120.

The at least one scheduled device 120 accesses the scheduling device 110 in a wireless manner, and the scheduling device 110 schedules a radio resource for each scheduled device 120, so that each scheduled device 120 receives or sends data on the resource scheduled by the scheduling device 110.

The scheduling device 110 and the scheduled device 120 may be implemented as different network devices according to different actual application scenarios. For example, in a cellular communications network, the scheduling device 110 may be a base station, and the scheduled device 120 may be a user terminal, for example, a mobile phone; in a wireless local area network, the scheduling device 110 may be a wireless access point (AP), for example, a wireless router, and the scheduled device 120 may be a wireless terminal, for example, a smartphone, a notebook, or a tablet computer, connected to the wireless access point; in a Zigbee network, the scheduling device 110 may be a coordinator, and the scheduled device 120 may be a Zigbee terminal; or in a wireless sensor network, the scheduling device 110 may be a cluster head node, and the scheduled device 120 may be a non-cluster head node.

To resolve a problem that consumption of processing resources and power resources is relatively large, and a battery life of the scheduled device is affected in a conventional scheduling mechanism, in the solution shown in embodiments of the present invention, the scheduling device 110 negotiates with the scheduled device 120, to divide an available resource range in a scheduling period into two parts: a pre-scheduling resource range and a dynamic scheduling resource range. When the scheduling device 110 performs data communication with the scheduled device 120, for a burst service, the scheduled device 120 performs control signaling detection in each subframe in the dynamic scheduling resource range, and receives or sends data of the burst service on a detected radio resource; for a periodic service, the scheduling device 110 allocates some resources in the pre-scheduling resource range as scheduling resources, and the scheduled device 120 performs control signaling detection on the scheduling resources to obtain a radio resource used for communication, and receives or sends data of the periodic service on the obtained radio resource, but the scheduled device 120 performs control signaling detection on none of other resources different from the scheduling resources in the pre-scheduling resource range, so that power consumption for performing control signaling detection on the other resources by the scheduled device 120 is avoided.

Figures 1, 2A:
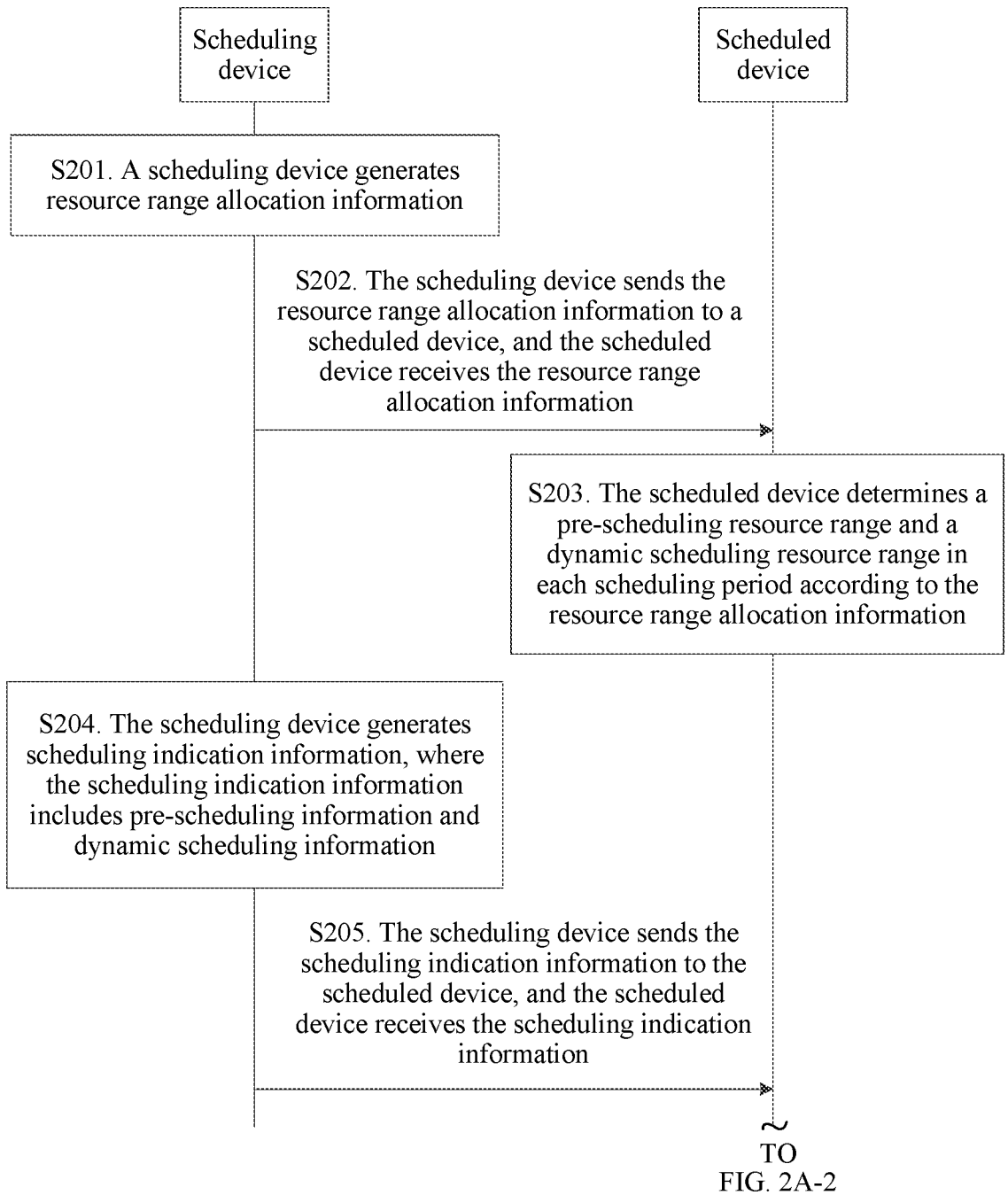

Referring to FIG. 2A-1 and FIG. 2A-2, FIG. 2A-1 and FIG. 2A-2 are a flowchart of a resource scheduling method according to an embodiment of the present invention. The method may be applied to the implementation environment shown in FIG. 1. The resource scheduling method may include the following steps.

Step 201: A scheduling device generates resource range allocation information.

The resource range allocation information is used to indicate a pre-scheduling resource range and a dynamic scheduling resource range in at least one scheduling period.

The scheduling device may generate the resource range allocation information according to information about a scheduled device accessing the scheduling device.

The information about a scheduled device accessing the scheduling device includes at least one of the following: a quantity of scheduled devices, types of the scheduled devices, service types of the scheduled devices, various service transmission periods of the scheduled devices, or various sizes of service volumes of the scheduled devices.

The pre-scheduling resource range is all or a part of an available time-frequency resource range in the at least one scheduling period. The dynamic scheduling resource range is a part of a resource range, other than the pre-scheduling resource range, included in the available time-frequency resource range in the at least one scheduling period. Optionally, one scheduling period includes at least one subframe.

Step 202: The scheduling device sends the resource range allocation information to a scheduled device, and the scheduled device receives the resource range allocation information.

Step 203: The scheduled device determines a pre-scheduling resource range and a dynamic scheduling resource range in each scheduling period according to the resource range allocation information.

Step 201 to step 203 are steps in which the scheduling device and the scheduled device negotiate about division of the pre-scheduling resource range and the dynamic scheduling resource range in each scheduling period.

In an implementation shown in this embodiment of the present invention, a time length of each scheduling period may not be fixed, and the pre-scheduling resource range and the dynamic scheduling resource range in each scheduling period may not be fixed either. In this case, the scheduling device may determine a time length of one or more scheduling periods according to a quantity, types, service types, sizes of service volumes, and service transmission periods of scheduled devices accessing the scheduling device, and determine the pre-scheduling resource range and the dynamic scheduling resource range in each of the one or more scheduling periods. For example, when a quantity of scheduled devices accessing the scheduling device is smaller, a time length of each scheduling period may be set to be shorter, so that scheduling is more flexible, or when a quantity of scheduled devices is larger, a time length of each scheduling period may be set to be longer, so as to reduce a quantity of negotiation times and reduce communication resources. Alternatively, when service traffic of a periodic service is larger and service traffic of a burst service is smaller in services used by the scheduled device accessing the scheduling device, the pre-scheduling resource range in each scheduling period may be set to be larger, and the dynamic scheduling resource range may be set to be smaller. On the contrary, when service traffic of a periodic service is smaller and service traffic of a burst service is larger in services used by the scheduled device accessing the scheduling device, the pre-scheduling resource range in each scheduling period may be set to be smaller, and the dynamic scheduling resource range may be set to be larger. The scheduling device may comprehensively consider service statuses of all the scheduled devices, and set a same time length of a scheduling period and same division of the pre-scheduling resource range and the dynamic scheduling resource range in each scheduling period for all the scheduled devices. In addition, the scheduling device may set, with reference to service usage of the scheduled device, a time length of a scheduling period and division of the pre-scheduling resource range and the dynamic scheduling resource range in each scheduling period for one scheduled device or each of a plurality of scheduled devices or all scheduled devices. The scheduling device sets a time length of a scheduling period and division of the pre-scheduling resource range and the dynamic scheduling resource range in each scheduling period for one scheduled device or each of a plurality of scheduled devices or all scheduled devices. This can better fit a service characteristic of the scheduled device, have higher flexibility, and achieve a better power saving effect.

In addition, when the scheduling device and the scheduled device negotiate about the pre-scheduling resource range and the dynamic scheduling resource range in each scheduling period, the pre-scheduling resource range and the dynamic scheduling resource range in each scheduling period may be obtained by means of division only according to a time domain, or may be obtained by means of division only according to a frequency domain, or may be obtained by means of division according to both a time domain and a frequency domain. Examples are as follows.

Figure 2B:
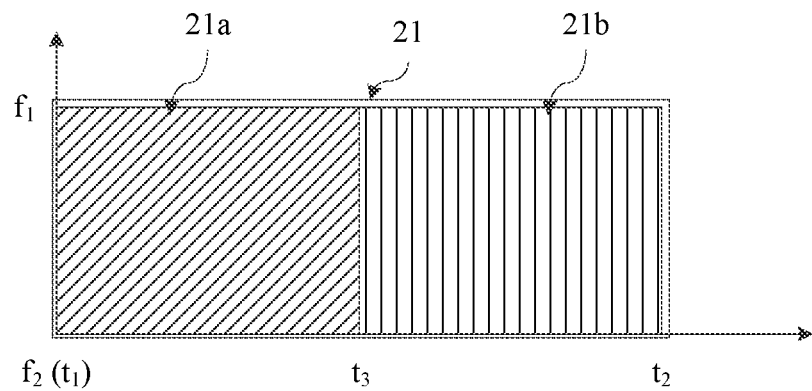
FIG. 2B is a schematic diagram of performing resource area division according to a time domain according to the embodiment shown in FIG. 2A-1 and FIG. 2A-2.

Referring to FIG. 2B, FIG. 2B is a schematic diagram of performing resource area division according to a time domain according to an embodiment of the present invention. For a scheduling period, a time period is from $t_1$ to $t_2$, a frequency range is from $f_1$ to $f_2$, $t_3$ is a moment between $t_1$ and $t_2$, and an entire available time-frequency resource area 21 in the scheduling period includes all resources in the frequency range of $f_1$ to $f_2$ in the time period of $t_1$ to $t_2$. A resource area 21a (resources in the frequency range of $f_1$ to $f_2$ in a time period of $t_1$ to $t_3$) is a pre-scheduling resource range, and a resource area 21b (resources in the frequency range of $f_1$ to $f_2$ in a time period of $t_3$ to $t_2$) is a dynamic scheduling resource range.

Figure 2C:
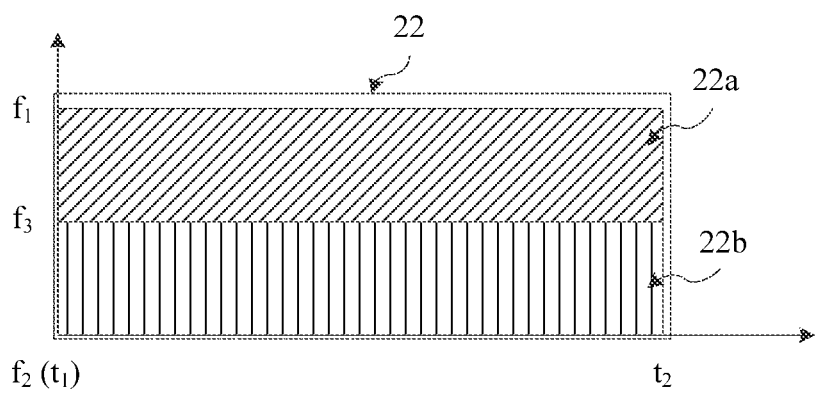
FIG. 2C is a schematic diagram of performing resource area division according to a frequency domain according to the embodiment shown in FIG. 2A-1 and FIG. 2A-2.

Referring to FIG. 2C, FIG. 2C is a schematic diagram of performing resource area division according to a frequency domain according to an embodiment of the present invention. For a scheduling period, a time period is from $t_1$ to $t_2$, a frequency range is from $f_1$ to $f_2$, $f_3$ is a frequency between $f_1$ and $f_2$, and an entire available time-frequency resource area 22 in the scheduling period includes all resources in the frequency range of $f_1$ to $f_2$ in the time period of $t_1$ to $t_2$. A resource area 22a (resources in a frequency range of $f_1$ to $f_3$ in the time period of $t_1$ to $t_2$) is a pre-scheduling resource range, and a resource area 22b (resources in a frequency range of $f_3$ to $f_2$ in the time period of $t_1$ to $t_2$) is a dynamic scheduling resource range.

Figure 2D:
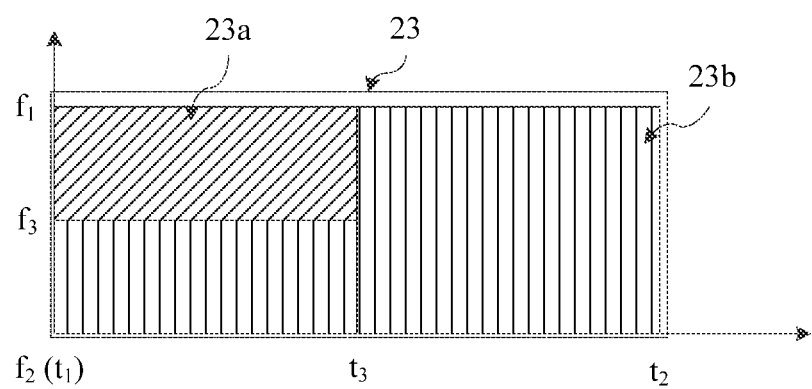
FIG. 2D is a schematic diagram of performing resource area division according to a time domain and a frequency domain according to the embodiment shown in FIG. 2A-1 and FIG. 2A-2.

Referring to FIG. 2D, FIG. 2D is a schematic diagram of performing resource area division according to a time domain and a frequency domain according to an embodiment of the present invention. For a scheduling period, a time period is from $t_1$ to $t_2$, a frequency range is from $f_1$ to $f_2$, $t_3$ is a moment between $t_1$ and $t_2$, $f_3$ is a frequency between $f_1$ and $f_2$, and an entire available time-frequency resource area 23 in the scheduling period includes all resources in the frequency range of $f_1$ to $f_2$ in the time period of $t_1$ to $t_2$. A resource area 23a (resources in a frequency range of $f_1$ to $f_3$ in a time period of $t_1$ to $t_3$) is a pre-scheduling resource range, and a resource area 23b (resources in a frequency range of $f_3$ to $f_2$ in the time period of $t_1$ to $t_3$ and resources in the frequency range of $f_1$ to $f_2$ in a time period of $t_3$ to $t_2$) is a dynamic scheduling resource range.

Alternatively, in another implementation, a time length of each scheduling period may be fixed, and division of the pre-scheduling resource range and the dynamic scheduling resource range in each scheduling period may also be fixed. In this case, the scheduling device and the scheduled device need to negotiate only once to determine resource range allocation for all scheduling periods. Alternatively, in this case, the scheduled device may preset resource range allocation even without negotiating with the scheduling device.

Optionally, the scheduling device may generate the resource range allocation information of the scheduled device according to service usage of the scheduled device.

Step 204: The scheduling device generates scheduling indication information, where the scheduling indication information includes pre-scheduling information and dynamic scheduling information.

The pre-scheduling information may indicate whether the scheduling device allocates a radio resource to the scheduled device in the pre-scheduling resource range in the at least one scheduling period, and when the pre-scheduling information may indicate that the scheduling device allocates a radio resource to the scheduled device in the pre-scheduling resource range, the pre-scheduling information may further indicate a scheduling resource in the pre-scheduling resource range or may indicate a radio resource that is in the pre-scheduling resource range and that is allocated to the scheduled device. The dynamic scheduling information may indicate whether the scheduling device allocates a radio resource to the scheduled device in the dynamic scheduling resource range in the at least one scheduling period.

The scheduling device may generate the scheduling indication information according to at least one of the following information: a quantity of scheduled devices accessing the scheduling device, types of the scheduled devices, service types of the scheduled devices, sizes of service volumes of the scheduled devices, or service transmission periods of the scheduled devices. The service types may include a periodic service and a burst service.

For example, if a currently scheduled device has a periodic service, the generated pre-scheduling information may indicate that the scheduling device is to allocate a radio resource to the scheduled device in the pre-scheduling resource range, and the pre-scheduling information further indicates which resource in the pre-scheduling resource range is a resource to be allocated to the scheduled device for receiving or sending data, or the pre-scheduling information further indicates which resource in the pre-scheduling resource range is a resource carrying control signaling used for resource scheduling. When the pre-scheduling information indicates which resource in the pre-scheduling resource range is a resource to be allocated to the scheduled device for receiving or sending data or a resource carrying control signaling, information such as a quantity, types, service types, sizes of service volumes, and service transmission periods of scheduled devices may be comprehensively considered to generate the pre-scheduling information. If the currently scheduled device has no periodic service, the generated pre-scheduling information may indicate that the scheduling device is not to allocate a radio resource to the scheduled device in the pre-scheduling resource range. If the currently scheduled device has a burst service, the generated dynamic scheduling information may indicate that the scheduling device is to allocate a radio resource to the scheduled device in the dynamic scheduling resource range. If the currently scheduled device has no burst service, the generated dynamic scheduling information may indicate that the scheduling device is not to allocate a radio resource to the scheduled device in the dynamic scheduling resource range.

Specifically, LTE is used as an example, and a pre-scheduling information format includes: an identifier of the scheduled device, for example, a cell radio network temporary identifier (C-RNTI) allocated by the scheduling device to the scheduled device, or a device identifier of the scheduled device, for example, an international mobile subscriber identity (IMSI), or the like; a time and/or a frequency at which the scheduled device receives a radio signal, for example, a subframe in which the scheduled device receives the radio signal in the pre-scheduling resource range, a subcarrier on which the scheduled device receives the radio signal in the pre-scheduling resource range, and a time and/or a frequency at which the scheduled device receives the radio signal in the pre-scheduling resource range; a time and/or a frequency at which the scheduled device sends a radio signal, for example, a subframe in which the scheduled device sends the radio signal in the pre-scheduling resource range, a subcarrier on which the scheduled device sends the radio signal in the pre-scheduling resource range, and a time and/or a frequency at which the scheduled device sends the radio signal in the pre-scheduling resource range; and a time and/or a frequency at which the scheduled device detects control signaling, for example, a subframe in which the scheduled device detects the control signaling in the pre-scheduling resource range, a subcarrier on which the scheduled device detects the control signaling in the pre-scheduling resource range, and a time and/or a frequency at which the scheduled device detects the control signaling in the pre-scheduling resource range.

Further, the pre-scheduling information may include information such as a modulation scheme and a coding scheme used when the scheduled device sends and/or receives the radio signal.

The dynamic scheduling information may include information indicating whether the scheduling device allocates a resource to the scheduled device in the dynamic scheduling resource range.

In the foregoing steps, the scheduling device specifies, for each scheduling device according to related information such as a quantity, types, and services of scheduled devices accessing the scheduling device, a resource used for communication or control signaling detection, divides a resource range for each scheduled device, and comprehensively considers actual usage of each scheduled device, so as to optimize resource usage efficiency of each scheduled device, and improve an overall scheduling effect of each scheduled device.

Step 205: The scheduling device sends the scheduling indication information to the scheduled device, and the scheduled device receives the scheduling indication information.

The scheduling device may send the scheduling indication information to the scheduled device in the following manners.

(1) The scheduling device sends the scheduling indication information by using a subframe preceding the at least one scheduling period, and the scheduled device receives the scheduling indication information carried by the subframe preceding the at least one scheduling period. The subframe carrying the scheduling indication information may also be referred to as a beacon frame.

Figure 2E:
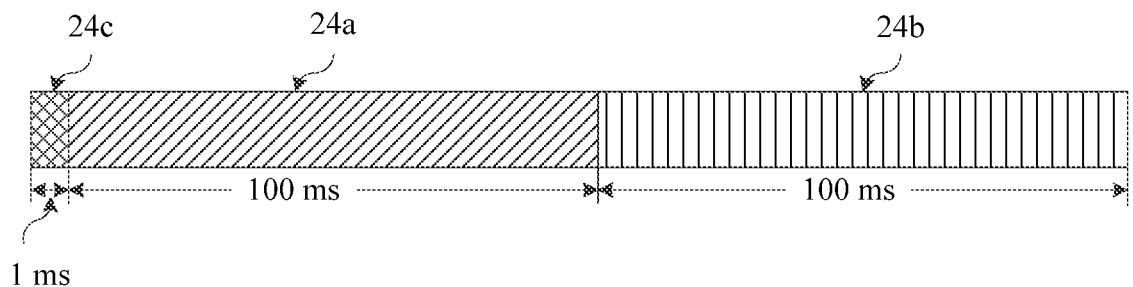
FIG. 2E is a schematic diagram of carrying scheduling indication information according to the embodiment shown in FIG. 2A-1 and FIG. 2A-2.

Referring to FIG. 2E, FIG. 2E is a schematic diagram of carrying scheduling indication information. A scheduling period is 200 ms, a resource range of all available frequencies in first 100 ms is a pre-scheduling resource range 24a, and a resource range of all available frequencies in later 100 ms is a dynamic scheduling resource range 24b. The scheduling device sends the scheduling indication information in a subframe 24c preceding the pre-scheduling resource range 24a, and correspondingly, the scheduled device also receives the scheduling indication information in the subframe 24c.

(2) The scheduling device sends the scheduling indication information by using a subframe in the pre-scheduling resource range, and the scheduled device receives the scheduling indication information carried by the subframe in the pre-scheduling resource range. The subframe carrying the scheduling indication information may also be referred to as a beacon frame.

Figure 2F:
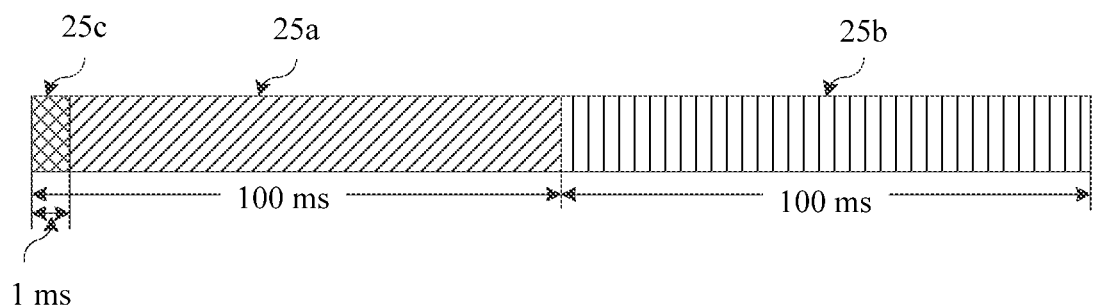
FIG. 2F is another schematic diagram of carrying scheduling indication information according to the embodiment shown in FIG. 2A-1 and FIG. 2A-2.

Referring to FIG. 2F, FIG. 2F is another schematic diagram of carrying scheduling indication information. A scheduling period is 200 ms, a resource range of all available frequencies in first 100 ms is a pre-scheduling resource range 25a, and a resource range of all available frequencies in later 100 ms is a dynamic scheduling resource range 25b. The scheduling device sends the scheduling indication information in a beacon frame 25c from which the pre-scheduling resource range 25a starts, and correspondingly, the scheduled device also receives the scheduling indication information in the beacon frame 25c.

(3) The scheduling device sends the scheduling indication information by using a specified data packet in the pre-scheduling resource range, and the scheduled device receives the scheduling indication information carried by the specified data packet in the pre-scheduling resource range.

Figure 2G:
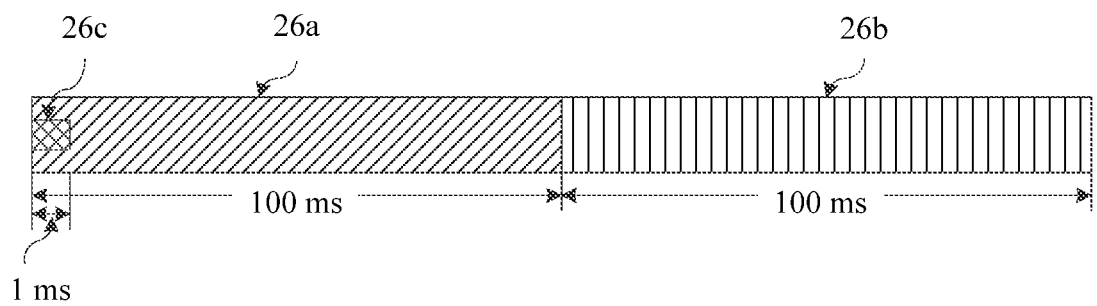
FIG. 2G is still another schematic diagram of carrying scheduling indication information according to the embodiment shown in FIG. 2A-1 and FIG. 2A-2.

Referring to FIG. 2G, FIG. 2G is still another schematic diagram of carrying scheduling indication information. A scheduling period is 200 ms, a resource range of all available frequencies in first 100 ms is a pre-scheduling resource range 26a, and a resource range of all available frequencies in later 100 ms is a dynamic scheduling resource range 26b. The scheduling device sends the scheduling indication information on a data packet 26c from which the pre-scheduling resource range 26a starts, and correspondingly, the scheduled device also receives the scheduling indication information on the data packet 26c. The data packet carrying the pre-scheduling information may be a broadcast data packet, a multicast data packet, or a data packet dedicated to the scheduled device.

(4) The scheduling device sends the scheduling indication information by using a specified PDCCH of a specified subframe in the pre-scheduling resource range, and the scheduled device receives the scheduling indication information carried by the specified physical downlink control channel (PDCCH) of the specified subframe in the pre-scheduling resource range.

Figure 2H:
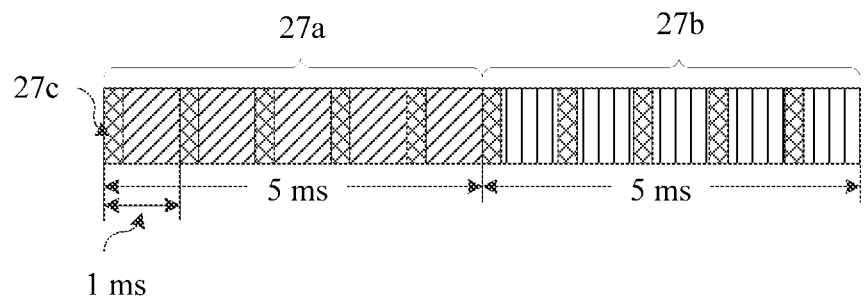
FIG. 2H is yet another schematic diagram of carrying scheduling indication information according to the embodiment shown in FIG. 2A-1 and FIG. 2A-2.

Referring to FIG. 2H, FIG. 2H is yet another schematic diagram of carrying scheduling indication information. A scheduling period is 10 ms, a resource range of all available frequencies in first 5 ms is a pre-scheduling resource range 27a, and a resource range of all available frequencies in later 5 ms is a dynamic scheduling resource range 27b. The scheduling device sends the scheduling indication information on a PDCCH of a subframe (27c shown in FIG. 2H) from which the pre-scheduling resource range 27a starts, and correspondingly, the scheduled device also receives the scheduling indication information on the PDCCH.

(5) The scheduling device sends channel indication information by using a specified PDCCH of a specified subframe in the pre-scheduling resource range, and sends the scheduling indication information by using a PDSCH indicated by the channel indication information; the scheduled device receives the channel indication information carried by the specified PDCCH of the specified subframe in the pre-scheduling resource range, and receives the scheduling indication information carried by the physical downlink shared channel PDSCH indicated by the channel indication information.

Figure 2I:
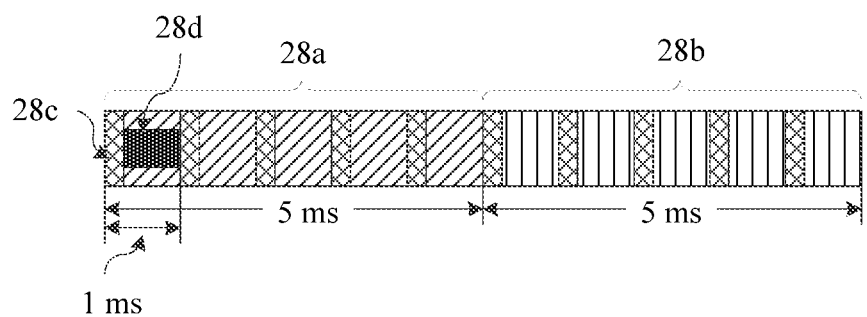
FIG. 2I is still yet another schematic diagram of carrying scheduling indication information according to the embodiment shown in FIG. 2A-1 and FIG. 2A-2.

Referring to FIG. 2I, FIG. 2I is still yet another schematic diagram of carrying scheduling indication information. A scheduling period is 10 ms, a resource range of all available frequencies in first 5 ms is a pre-scheduling resource range 28a, and a resource range of all available frequencies in later 5 ms is a dynamic scheduling resource range 28b. The scheduling device transmits channel indication information on a PDCCH of a subframe (28c shown in FIG. 2I) from which the pre-scheduling resource range 28a starts, and the channel indication information indicates a later PDSCH (28d shown in FIG. 2I). Correspondingly, the scheduled device also receives the scheduling indication information on the PDSCH.

(6) The scheduling device sends the scheduling indication information by using a specified data packet existing before the at least one scheduling period, and the scheduled device receives the scheduling indication information carried by the specified data packet existing before the at least one scheduling period.

Figure 2J:
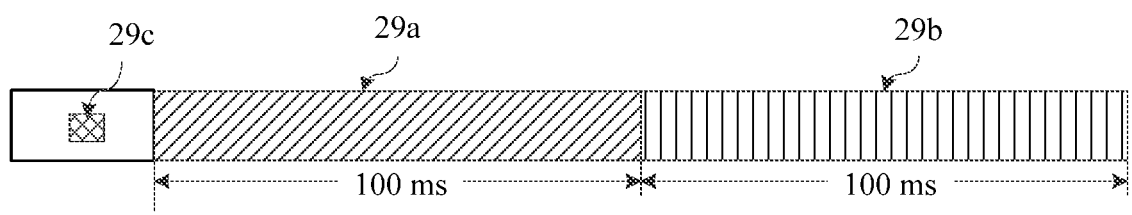
FIG. 2J is a further schematic diagram of carrying scheduling indication information according to the embodiment shown in FIG. 2A-1 and FIG. 2A-2.

Referring to FIG. 2J, FIG. 2J is a further schematic diagram of carrying scheduling indication information. A scheduling period is 200 ms, a resource range of all available frequencies in first 100 ms is a pre-scheduling resource range 29a, and a resource range of all available frequencies in later 100 ms is a dynamic scheduling resource range 29b. The scheduling device sends the scheduling indication information on a data packet 29c preceding the pre-scheduling resource range 29a, and correspondingly, the scheduled device also receives the scheduling indication information on the data packet 29c. The data packet carrying the pre-scheduling information may be a broadcast data packet, a multicast data packet, or a data packet dedicated to the scheduled device.

It should be noted that there is no order of performing step 201 and step 202 and performing step 204 and step 205. For example, step 201 and step 204 may be combined, that is, the resource range allocation information and the scheduling indication information are simultaneously generated, and the resource range allocation information and the scheduling indication information may be separately sent by using different messages, or may be sent by using a same message. An order of generating and sending the resource range allocation information and generating and sending the scheduling indication information is not limited in this embodiment of the present invention.

Step 206: When the pre-scheduling information indicates that the scheduling device allocates a radio resource to the scheduled device in the pre-scheduling resource range, the scheduled device performs data reception or sending or control signaling detection on the radio resource indicated by the pre-scheduling information.

When the pre-scheduling information indicates that the scheduling device allocates a radio resource to the scheduled device in the pre-scheduling resource range, the pre-scheduling information may directly indicate an allocated radio resource used for communication, and the scheduled device directly performs data reception or sending on the radio resource indicated by the pre-scheduling information. Alternatively, when the pre-scheduling information indicates that the scheduling device allocates a radio resource to the scheduled device in the pre-scheduling resource range, the pre-scheduling information may indicate a scheduling resource, and the scheduled device performs control signaling detection on the scheduling resource indicated by the pre-scheduling information, to obtain a radio resource used for reception or sending, and performs data reception or sending on the radio resource. Both the scheduling resource and the radio resource that is allocated to the scheduled device and that is used for communication are time-frequency resources in the pre-scheduling resource range.

Optionally, the scheduled device does not perform control signaling detection and data reception and sending in a resource, in the pre-scheduling resource range, other than the resource indicated by the pre-scheduling information. If the pre-scheduling information indicates that the scheduling device does not allocate a radio resource to the scheduled device in the pre-scheduling resource range, the scheduled device performs control signaling detection and data reception and sending on none of resources in the pre-scheduling resource range.

Step 207: When the dynamic scheduling information indicates that the scheduling device allocates a radio resource used for communication to the scheduled device in the dynamic scheduling resource range, the scheduled device performs control signaling detection in each subframe in the dynamic scheduling resource range.

When the dynamic scheduling information indicates that the scheduling device allocates a radio resource used for communication to the scheduled device in the dynamic scheduling resource range, the scheduled device performs control signaling detection in each subframe in the dynamic scheduling resource range, and determines, according to a control signaling detection result, whether the scheduling device allocates a radio resource to the scheduled device, and if the scheduling device allocates a radio resource to the scheduled device, the scheduled device performs data reception or sending on the allocated radio resource.

If services of the scheduled device include a burst service, the scheduling device schedules the dynamic scheduling resource range for the burst service, and allocates a radio resource to the scheduled device in the dynamic scheduling resource range. In this case, because the scheduled device performs control signaling detection in each subframe in the dynamic scheduling resource range, when detecting, in a subframe in the dynamic scheduling resource range, a radio resource that is indicated by control signaling and that is used for communication, the scheduled device receives or sends data of the burst service by using the radio resource.

Optionally, when the dynamic scheduling information indicates that the scheduling device does not allocate a radio resource to the scheduled device in the dynamic scheduling resource range, the scheduled device performs control signaling detection on none of resources in the dynamic scheduling resource range.

Step 208: When the pre-scheduling information indicates that the scheduling device does not allocate a radio resource to the scheduled device in the pre-scheduling resource range, and the dynamic scheduling information indicates that the scheduling device does not allocate a radio resource to the scheduled device in the dynamic scheduling resource range, the scheduled device enters a sleep mode.

It should be noted that step 208 is an optional step and is not a mandatory step in this embodiment of the present invention.

In conclusion, in the resource scheduling method shown in this embodiment of the present invention, the scheduling device divides an available resource range in a scheduling period to obtain a resource range and uses the resource range as the pre-scheduling resource range, and sends the corresponding pre-scheduling information to the scheduled device. The scheduled device performs data reception or sending on the radio resource indicated by the pre-scheduling information, only when the pre-scheduling information in the scheduling indication information indicates that the scheduling device allocates a radio resource to the scheduled device in the pre-scheduling resource range, and the scheduled device does not need to perform control signaling detection on all resources in the pre-scheduling resource range, so that power consumption of the scheduled device is reduced, and a battery life of the scheduled device is increased.

In addition, according to the method shown in this embodiment of the present invention, when the pre-scheduling information indicates that the scheduling device does not allocate a radio resource to the scheduled device in the pre-scheduling resource range, the scheduled device performs control signaling detection on none of resources in the pre-scheduling resource range, so that power consumption of the scheduled device is further reduced, and a battery life of the scheduled device is increased.

In addition, according to the method shown in this embodiment of the present invention, the scheduled device performs control signaling detection on all resources in the dynamic scheduling resource range only when the dynamic scheduling information in the scheduling indication information indicates that the scheduling device allocates a radio resource to the scheduled device in the dynamic scheduling resource range, and if the dynamic scheduling information indicates that the scheduling device does not allocate a radio resource to the scheduled device in the dynamic scheduling resource range, the scheduled device does not perform control signaling detection in the dynamic scheduling resource range, so that power consumption of the scheduled device is further reduced.

In addition, according to the method shown in this embodiment of the present invention, when the pre-scheduling information indicates that the scheduling device does not allocate a radio resource to the scheduled device in the pre-scheduling resource range, and the dynamic scheduling information indicates that the scheduling device does not allocate a radio resource to the scheduled device in the dynamic scheduling resource range, the scheduled device enters the sleep mode, so that power consumption of the scheduled device is further reduced.

Figure 3:
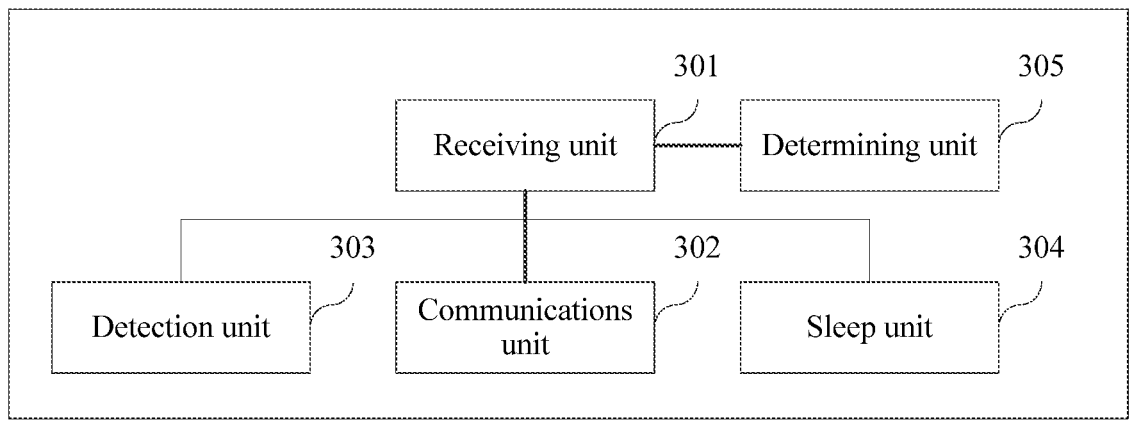
FIG. 3 is a structural diagram of a resource scheduling apparatus according to an embodiment of the present invention.

Referring to FIG. 3, FIG. 3 is a structural diagram of a resource scheduling apparatus according to an embodiment of the present invention. The resource scheduling apparatus may be implemented, by using hardware or a combination of hardware and software, as the scheduled device 120 in the implementation environment shown in FIG. 1, and is configured to perform all or some steps performed by the scheduled device in FIG. 2A-1 and FIG. 2A-2. The apparatus may include a receiving unit 301 and a communications unit 302.

The receiving unit 301 is configured to receive scheduling indication information sent by a scheduling device, where the scheduling indication information includes pre-scheduling information.

The communications unit 302 is configured to: when the pre-scheduling information indicates that the scheduling device allocates a radio resource to the scheduled device in a pre-scheduling resource range, perform data reception or sending or control signaling detection on the radio resource indicated by the pre-scheduling information.

The radio resource indicated by the pre-scheduling information is a time-frequency resource in the pre-scheduling resource range, and the pre-scheduling resource range is all or a part of an available time-frequency resource range in at least one scheduling period.

Optionally, the communications unit 302 is specifically configured to: perform control signaling detection on a scheduling resource indicated by the pre-scheduling information, to obtain the radio resource, and perform data reception or sending on the radio resource.

The scheduling resource is a time-frequency resource in the pre-scheduling resource range.

Optionally, the scheduling indication information further includes dynamic scheduling information, and the apparatus further includes: a detection unit 303, configured to: when the dynamic scheduling information indicates that the scheduling device allocates a radio resource to the scheduled device in a dynamic scheduling resource range, perform control signaling detection in the dynamic scheduling resource range.

The dynamic scheduling resource range is a part of a resource range, other than the pre-scheduling resource range, included in the available time-frequency resource range in the at least one scheduling period.

Optionally, the communications unit 302 is further configured to: when the pre-scheduling information indicates that the scheduling device does not allocate a radio resource to the scheduled device in the pre-scheduling resource range, skip performing data reception or sending or control signaling detection in the pre-scheduling resource range.

The communications unit 302 is further configured to: when the dynamic scheduling information indicates that the scheduling device does not allocate a radio resource to the scheduled device in the dynamic scheduling resource range, skip performing data reception or sending or control signaling detection in the dynamic scheduling resource range.

The apparatus further includes: a sleep unit 304, configured to: when the pre-scheduling information indicates that the scheduling device does not allocate a radio resource to the scheduled device in the pre-scheduling resource range, and the dynamic scheduling information indicates that the scheduling device does not allocate a radio resource to the scheduled device in the dynamic scheduling resource range, control the scheduled device to enter a sleep mode.

Optionally, the receiving unit 301 is configured to receive the scheduling indication information carried by a subframe preceding the at least one scheduling period; or the receiving unit 301 is configured to receive the scheduling indication information carried by a specified data packet in the pre-scheduling resource range; or the receiving unit 301 is configured to receive the scheduling indication information carried by a subframe in the pre-scheduling resource range; or the receiving unit 301 is configured to receive the scheduling indication information carried by a specified physical downlink control channel (PDCCH) of a specified subframe in the pre-scheduling resource range; or the receiving unit 301 is configured to: receive channel indication information carried by a specified PDCCH of a specified subframe in the pre-scheduling resource range, and receive the scheduling indication information carried by a physical downlink shared channel PDSCH indicated by the channel indication information; or the receiving unit 301 is configured to receive the scheduling indication information carried by a specified data packet existing before the at least one scheduling period.

Optionally, the receiving unit 301 is further configured to: receive resource range allocation information sent by the scheduling device, where the resource range allocation information is used to indicate the pre-scheduling resource range and the dynamic scheduling resource range in the at least one scheduling period.

The apparatus further includes a determining unit 305.

The determining unit 305 is configured to determine the pre-scheduling resource range and the dynamic scheduling resource range in the at least one scheduling period according to the resource range allocation information.

In conclusion, according to the resource scheduling apparatus shown in this embodiment of the present invention, the scheduling device divides an entire available resource range in a scheduling period to obtain a resource range and uses the resource range as the pre-scheduling resource range, and sends the corresponding pre-scheduling information to the scheduled device. The scheduled device performs data reception or sending on the radio resource indicated by the pre-scheduling information, only when the pre-scheduling information in the scheduling indication information indicates that the scheduling device allocates a radio resource to the scheduled device in the pre-scheduling resource range, and the scheduled device does not need to perform control signaling detection on all resources in the pre-scheduling resource range, so that power consumption of the scheduled device is reduced, and a battery life of the scheduled device is increased.

In addition, according to the apparatus shown in this embodiment of the present invention, when the pre-scheduling information indicates that the scheduling device does not allocate a radio resource to the scheduled device in the pre-scheduling resource range, the scheduled device performs control signaling detection on none of resources in the pre-scheduling resource range, so that power consumption of the scheduled device is further reduced, and a battery life of the scheduled device is increased.

In addition, according to the apparatus shown in this embodiment of the present invention, the scheduled device performs control signaling detection on all resources in the dynamic scheduling resource range only when the dynamic scheduling information in the scheduling indication information indicates that the scheduling device allocates a radio resource to the scheduled device in the dynamic scheduling resource range, and if the dynamic scheduling information indicates that the scheduling device does not allocate a radio resource to the scheduled device in the dynamic scheduling resource range, the scheduled device does not perform control signaling detection on a resource in the dynamic scheduling resource range, so that power consumption of the scheduled device is further reduced.

In addition, according to the apparatus shown in this embodiment of the present invention, when the pre-scheduling information indicates that the scheduling device does not allocate a radio resource to the scheduled device in the pre-scheduling resource range, and the dynamic scheduling information indicates that the scheduling device does not allocate a radio resource to the scheduled device in the dynamic scheduling resource range, the scheduled device enters the sleep mode, so that power consumption of the scheduled device is further reduced.

Figure 4:
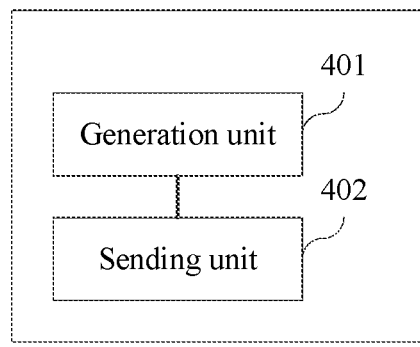
FIG. 4 is a structural diagram of a resource scheduling apparatus according to an embodiment of the present invention.

Referring to FIG. 4, FIG. 4 is a structural diagram of a resource scheduling apparatus according to an embodiment of the present invention. The resource scheduling apparatus may be implemented, by using hardware or a combination of hardware and software, as the scheduling device 110 in the implementation environment shown in FIG. 1, and is configured to perform all or some steps performed by the scheduling device in FIG. 2A-1 and FIG. 2A-2. The apparatus may include a generation unit 401 and a sending unit 402.

The generation unit 401 is configured to generate scheduling indication information, where the scheduling indication information includes pre-scheduling information.

The sending unit 402 is configured to send the scheduling indication information to a scheduled device, so that when the pre-scheduling information indicates that the scheduling device allocates a radio resource to the scheduled device in a pre-scheduling resource range, the scheduled device performs data reception or sending or control signaling detection on the radio resource indicated by the pre-scheduling information.

The radio resource indicated by the pre-scheduling information is a time-frequency resource in the pre-scheduling resource range, and the pre-scheduling resource range is all or a part of an available time-frequency resource range in at least one scheduling period.

Optionally, the scheduling indication information further includes dynamic scheduling information, and the dynamic scheduling information is used to indicate whether the scheduling device allocates a radio resource to the scheduled device in a dynamic scheduling resource range, so that when the dynamic scheduling information indicates that the scheduling device allocates a radio resource to the scheduled device in the dynamic scheduling resource range, the scheduled device performs control signaling detection on a resource in the dynamic scheduling resource range.

The dynamic scheduling resource range is a part of a resource range, other than the pre-scheduling resource range, included in the available time-frequency resource range in the at least one scheduling period.

Optionally, the sending unit 402 is configured to send the scheduling indication information by using a subframe preceding the at least one scheduling period; or the sending unit 402 is configured to send the scheduling indication information by using a subframe in the pre-scheduling resource range; or the sending unit 402 is configured to send the scheduling indication information by using a specified data packet in the pre-scheduling resource range; or the sending unit 402 is configured to send the scheduling indication information by using a specified PDCCH of a specified subframe in the pre-scheduling resource range; or the sending unit 402 is configured to: send channel indication information by using a specified PDCCH of a specified subframe in the pre-scheduling resource range, and send the scheduling indication information by using a physical downlink shared channel PDSCH indicated by the channel indication information; or the sending unit 402 is configured to send the scheduling indication information by using a specified data packet existing before the at least one scheduling period.

Optionally, the generation unit 401 is specifically configured to generate the scheduling indication information according to at least one of the following information: a quantity of scheduled devices accessing the scheduling device, types of the scheduled devices, service types of the scheduled devices, sizes of service volumes of the scheduled devices, or service transmission periods of the scheduled devices.

Optionally, the generation unit 401 is further configured to generate resource range allocation information according to information about scheduled devices accessing the scheduling device, where the resource range allocation information is used to indicate the pre-scheduling resource range and the dynamic scheduling resource range in the at least one scheduling period, and the information about scheduled devices accessing the scheduling device includes at least one of the following: a quantity of scheduled devices, types of the scheduled devices, service types of the scheduled devices, sizes of service volumes of the scheduled devices, or service transmission periods of the scheduled devices.

Optionally, the generation unit 401 is further configured to generate resource range allocation information of the scheduled device according to service usage of the scheduled device, where the resource range allocation information is used to indicate the pre-scheduling resource range and the dynamic scheduling resource range in the at least one scheduling period.

The sending unit 402 is further configured to send the resource range allocation information to the scheduled device.

In conclusion, according to the resource scheduling apparatus shown in this embodiment of the present invention, the scheduling device divides an entire available resource range in a scheduling period to obtain a resource range and uses the resource range as the pre-scheduling resource range, and sends the corresponding pre-scheduling information to the scheduled device. The scheduled device performs data reception or sending on the radio resource indicated by the pre-scheduling information, only when the pre-scheduling information in the scheduling indication information indicates that the scheduling device allocates a radio resource to the scheduled device in the pre-scheduling resource range, and the scheduled device does not need to perform control signaling detection on all resources in the pre-scheduling resource range, so that power consumption of the scheduled device is reduced, and a battery life of the scheduled device is increased.

Figure 5:
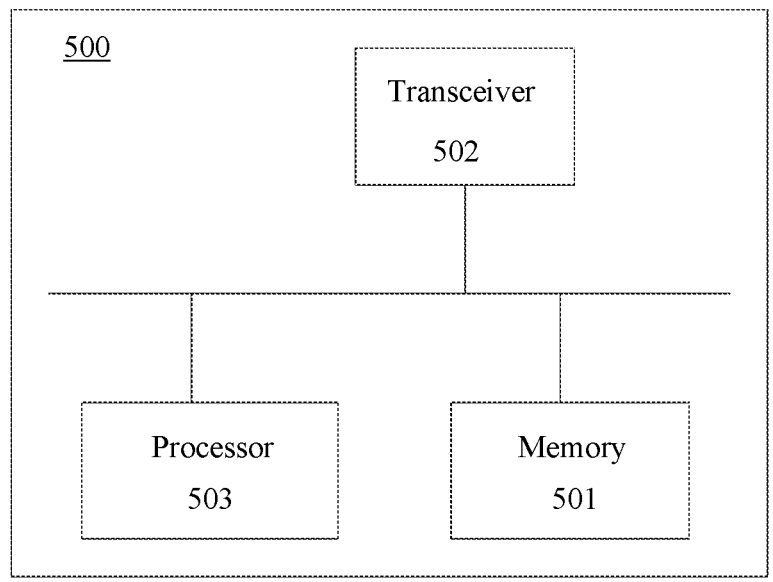
FIG. 5 is a block diagram of a scheduling device according to an embodiment of the present invention.

In the units shown in FIG. 3 and FIG. 4, the steps performed by the receiving unit and the sending unit may be completed by a transceiver under the control of a processor, and the steps performed by other units may be independently completed by the processor. Further, referring to FIG. 5, FIG. 5 is a block diagram of a network device according to an embodiment of the present invention. The network device 500 may be implemented as the scheduled device 120 or a scheduling device 110 in the network environment shown in FIG. 1. The network device 500 includes: a memory 501, a transceiver 502, and a processor 503 connected to the memory 501 and the transceiver 502. The memory 501 is configured to store an instruction, and the processor 503 is configured to execute the instruction stored in the memory 501. The memory 501 may be implemented by any type of volatile storage device or non-volatile storage device or a combination thereof, such as a static random access memory (SRAM), an electrically erasable programmable read-only memory (EEPROM), an erasable programmable read only memory (EPROM), a programmable read-only memory (PROM), a read-only memory (ROM), a magnetic memory, a flash memory, a magnetic disk, or an optical disc. Correspondingly, the memory 501 may further include a memory controller, so as to control access of the processor 503 to the memory. The transceiver 502 may be a wireless transceiver module into which a modem is integrated. It may be understood that the modem may be independently disposed outside the transceiver 502, and the processor 503 may be a central processing unit (CPU) or any coprocessor.

If the network device 500 is implemented as the scheduled device 120 in the network environment shown in FIG. 1, when executing the instruction stored in the memory 501, the processor 503 is configured to control the transceiver 502 to receive scheduling indication information sent by a scheduling device, where the scheduling indication information includes pre-scheduling information.

When the pre-scheduling information indicates that the scheduling device allocates a radio resource to the scheduled device in a pre-scheduling resource range, the processor 503 is configured to control the transceiver 502 to perform data reception or sending or control signaling detection on the radio resource indicated by the pre-scheduling information.

The radio resource indicated by the pre-scheduling information is a time-frequency resource in the pre-scheduling resource range, and the pre-scheduling resource range is all or a part of an available time-frequency resource range in at least one scheduling period.

Optionally, when data reception or sending or control signaling detection is to be performed on the radio resource indicated by the pre-scheduling information, the processor 503 is configured to: control the transceiver 502 to perform control signaling detection on a scheduling resource indicated by the pre-scheduling information, to obtain the radio resource, and control the transceiver 502 to perform data reception or sending on the radio resource.

The scheduling resource is a time-frequency resource in the pre-scheduling resource range.

Optionally, the scheduling indication information further includes dynamic scheduling information, and the processor 503 is further configured to: when the dynamic scheduling information indicates that the scheduling device allocates a radio resource to the scheduled device in a dynamic scheduling resource range, control the transceiver 502 to perform control signaling detection in the dynamic scheduling resource range.

The dynamic scheduling resource range is a part of a resource range, other than the pre-scheduling resource range, included in the available time-frequency resource range in the at least one scheduling period.

Optionally, the processor 503 is further configured to: when the pre-scheduling information indicates that the scheduling device does not allocate a radio resource to the scheduled device in the pre-scheduling resource range, control the transceiver not to perform data reception or sending or control signaling detection in the pre-scheduling resource range.

The processor 503 is further configured to: when the dynamic scheduling information indicates that the scheduling device does not allocate a radio resource to the scheduled device in the dynamic scheduling resource range, control the transceiver not to perform data reception or sending or control signaling detection in the dynamic scheduling resource range.

The processor 503 is further configured to: when the pre-scheduling information indicates that the scheduling device does not allocate a radio resource to the scheduled device in the pre-scheduling resource range, and the dynamic scheduling information indicates that the scheduling device does not allocate a radio resource to the scheduled device in the dynamic scheduling resource range, control the scheduled device to enter a sleep mode.

Optionally, the processor 503 is configured to: when controlling the transceiver 502 to receive the scheduling indication information sent by the scheduling device, control the transceiver 502 to receive the scheduling indication information carried by a subframe preceding the at least one scheduling period; or the processor 503 is configured to: when controlling the transceiver 502 to receive the scheduling indication information sent by the scheduling device, control the transceiver 502 to receive the scheduling indication information carried by a specified data packet in the pre-scheduling resource range; or the processor 503 is configured to: when controlling the transceiver 502 to receive the scheduling indication information sent by the scheduling device, control the transceiver 502 to receive the scheduling indication information carried by a beacon frame in the pre-scheduling resource range; or the processor 503 is configured to: when controlling the transceiver 502 to receive the scheduling indication information sent by the scheduling device, control the transceiver 502 to receive the scheduling indication information carried by a specified physical downlink control channel (PDCCH) of a specified subframe in the pre-scheduling resource range; or the processor 503 is configured to: when controlling the transceiver 502 to receive the scheduling indication information sent by the scheduling device, control the transceiver 502 to receive channel indication information carried by a specified PDCCH of a specified subframe in the pre-scheduling resource range, and control the transceiver 502 to receive the scheduling indication information carried by a physical downlink shared channel PDSCH indicated by the channel indication information; or the processor 503 is configured to: when controlling the transceiver 502 to receive the scheduling indication information sent by the scheduling device, control the transceiver 502 to receive the scheduling indication information carried by a specified data packet existing before the at least one scheduling period.

Optionally, the processor 503 is further configured to control the transceiver 502 to receive resource range allocation information sent by the scheduling device, where the resource range allocation information is used to indicate the pre-scheduling resource range and the dynamic scheduling resource range in the at least one scheduling period; and the processor 503 is further configured to determine the pre-scheduling resource range and the dynamic scheduling resource range in the at least one scheduling period according to the resource range allocation information.

If the network device 500 is implemented as the scheduling device 110 in the network environment shown in FIG. 1, when executing the instruction stored in the memory 501, the processor 503 is configured to generate scheduling indication information, where the scheduling indication information includes pre-scheduling information.

The processor 503 is further configured to control the transceiver 502 to send the scheduling indication information to a scheduled device, so that when the pre-scheduling information indicates that the scheduling device allocates a radio resource to the scheduled device in a pre-scheduling resource range, the scheduled device performs data reception or sending or control signaling detection on the radio resource indicated by the pre-scheduling information.

The radio resource indicated by the pre-scheduling information is a time-frequency resource in the pre-scheduling resource range, and the pre-scheduling resource range is all or a part of an available time-frequency resource range in at least one scheduling period.

Optionally, the scheduling indication information further includes dynamic scheduling information, and the dynamic scheduling information is used to indicate whether the scheduling device allocates a radio resource to the scheduled device in a dynamic scheduling resource range, so that when the dynamic scheduling information indicates that the scheduling device allocates a radio resource to the scheduled device in the dynamic scheduling resource range, the scheduled device performs control signaling detection on a resource in the dynamic scheduling resource range.

The dynamic scheduling resource range is a part of a resource range, other than the pre-scheduling resource range, included in the available time-frequency resource range in the at least one scheduling period.

Optionally, the processor 503 is configured to: when the scheduling indication information is to be sent to the scheduled device, control the transceiver 502 to send the scheduling indication information by using a subframe preceding the at least one scheduling period; or the processor 503 is configured to: when the scheduling indication information is to be sent to the scheduled device, control the transceiver 502 to send the scheduling indication information by using a beacon frame in the pre-scheduling resource range; or the processor 503 is configured to: when the scheduling indication information is to be sent to the scheduled device, control the transceiver 502 to send the scheduling indication information by using a specified data packet in the pre-scheduling resource range; or the processor 503 is configured to: when the scheduling indication information is to be sent to the scheduled device, control the transceiver 502 to send the scheduling indication information by using a specified PDCCH of a specified subframe in the pre-scheduling resource range; or the processor 503 is configured to: when the scheduling indication information is to be sent to the scheduled device, control the transceiver 502 to send channel indication information by using a specified PDCCH of a specified subframe in the pre-scheduling resource range, and control the transceiver 502 to send the scheduling indication information by using a physical downlink shared channel PDSCH indicated by the channel indication information; or the processor 503 is configured to: when the scheduling indication information is to be sent to the scheduled device, control the transceiver 502 to send the scheduling indication information by using a specified data packet existing before the at least one scheduling period.

Optionally, the processor 503 is configured to: when generating the scheduling indication information, generate the scheduling indication information according to at least one of the following information: a quantity of scheduled devices accessing the scheduling device, types of the scheduled devices, service types of the scheduled devices, sizes of service volumes of the scheduled devices, or service transmission periods of the scheduled devices.

Optionally, the processor 503 is configured to: when generating the scheduling indication information, generate the scheduling indication information according to a service type and/or a size of a service volume and/or a service transmission period of the scheduled device.

Optionally, the processor 503 is further configured to generate resource range allocation information according to information about scheduled devices accessing the scheduling device, where the resource range allocation information is used to indicate the pre-scheduling resource range and the dynamic scheduling resource range in the at least one scheduling period.

The processor 503 is further configured to control the transceiver 502 to send the resource range allocation information to the scheduled device.

The information about scheduled devices accessing the scheduling device includes at least one of the following: a quantity of scheduled devices, types of the scheduled devices, service types of the scheduled devices, sizes of service volumes of the scheduled devices, or service transmission periods of the scheduled devices.

Optionally, the processor 503 is configured to: when generating the resource range allocation information, separately generate resource range allocation information for one or more or all scheduled devices.

In conclusion, when the network device shown in this embodiment of the present invention is separately implemented as the scheduling device and the scheduled device, the scheduling device divides an entire available resource range in a scheduling period to obtain a resource range and uses the resource range as the pre-scheduling resource range, and sends the corresponding pre-scheduling information to the scheduled device. The scheduled device performs data reception or sending on the radio resource indicated by the pre-scheduling information, only when the pre-scheduling information in the scheduling indication information indicates that the scheduling device allocates a radio resource to the scheduled device in the pre-scheduling resource range, and the scheduled device does not need to perform control signaling detection on all resources in the pre-scheduling resource range, so that power consumption of the scheduled device is reduced, and a battery life of the scheduled device is increased.

In addition, when the pre-scheduling information indicates that the scheduling device does not allocate a radio resource to the scheduled device in the pre-scheduling resource range, the scheduled device performs control signaling detection on none of resources in the pre-scheduling resource range, so that power consumption of the scheduled device is further reduced, and a battery life of the scheduled device is increased.

In addition, the scheduled device performs control signaling detection in the dynamic scheduling resource range only when the dynamic scheduling information in the scheduling indication information indicates that the scheduling device allocates a radio resource to the scheduled device in the dynamic scheduling resource range, and if the dynamic scheduling information indicates that the scheduling device does not allocate a radio resource to the scheduled device in the dynamic scheduling resource range, the scheduled device does not perform control signaling detection on a resource in the dynamic scheduling resource range, so that power consumption of the scheduled device is further reduced.

In addition, when the pre-scheduling information indicates that the scheduling device does not allocate a radio resource to the scheduled device in the pre-scheduling resource range, and the dynamic scheduling information indicates that the scheduling device does not allocate a radio resource to the scheduled device in the dynamic scheduling resource range, the scheduled device enters the sleep mode, so that power consumption of the scheduled device is further reduced.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division may merely be logical function division and may be other division in actual implementation. For example, a plurality of units or components may be combined or integrated into another system, or some features may be ignored or not performed.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
   receiving, by a terminal, scheduling information from a network device, wherein the scheduling information indicates whether the network device has allocated any resource to the terminal in a first preset resource range of a physical downlink control channel (PDCCH), or indicates that the network device has allocated a resource to the terminal in first preset resource range of a PDCCH, and wherein the scheduling information further indicates that the network device has not allocated any resource to the terminal in a second preset resource range of the PDCCH, wherein an available resource of the PDCCH in at least one scheduling period is divided into the first preset resource range and the second preset resource range; and
   in response to the scheduling information indicating that the network device has allocated a resource to the terminal in the first preset resource range of the PDCCH, and that the network device has not allocated a resource to the terminal in the second preset resource range of the PDCCH, performing, by the terminal, control signaling detection in the first preset resource range of the PDCCH, and avoiding, by the terminal, control signaling detection in the second preset resource range of the PDCCH; or
   in response to the scheduling information indicating that the network device has not allocated any radio resource to the terminal in the first preset resource range of the PDCCH and that the network device has not allocated a resource to the terminal in the second preset resource range of the PDCCH, avoiding, by the terminal, control signaling detection in the first preset resource range and the second preset resource range of the PDCCH.

2. The method according to claim 1, further comprising:
   receiving, by the terminal, resource range information from the network device, wherein the resource range information indicates at least one of the first preset resource range or the second preset resource range of the PDCCH.

3. The method according to claim 2, wherein the resource range information is generated according to at least one of a quantity of terminals accessing the network device, types of terminals accessing the network device, service types of the terminals accessing the network device, sizes of service volumes of the terminals accessing the network device, or service transmission periods of the terminals accessing the network device.

4. The method according to claim 1, wherein the first preset resource range is a dynamic scheduling resource range, and the second preset resource range is a pre-scheduling resource range.

5. The method according to claim 4, wherein the scheduling information comprises dynamic scheduling information and pre-scheduling resource information, wherein the dynamic scheduling information indicates resource allocation of the dynamic scheduling resource range, and the pre-scheduling information indicates resource allocation of the pre-scheduling resource range.

6. An apparatus, comprising:
   a non-transitory memory storage comprising instructions; and
   one or more processors in communication with the memory storage, wherein the instructions, when executed by the one or more processors, cause the apparatus to:
   receive scheduling information from a network device, wherein the scheduling information indicates whether the network device has allocated any resource to the apparatus in a first preset resource range of a physical downlink control channel (PDCCH), or indicates that the network device has allocated a resource to the apparatus in a first preset resource range of a PDCCH, and the scheduling information further indicates that the network device has not allocated any resource to the apparatus in a second preset resource range of the PDCCH, wherein an available resource of the PDCCH in at least one scheduling period is divided into the first preset resource range and the second preset resource range; and in response to the scheduling information indicating that the network device has allocated a resource to the apparatus in the first preset resource range of the PDCCH, and that the network device has not allocated a resource to the apparatus in the second preset resource range of the PDCCH, perform, control signaling detection in the first preset resource range of the PDCCH, and avoid control signaling detection in the second preset resource range of the PDCCH; or in response to the scheduling information indicating that the network device has not allocated any radio resource to the apparatus in the first preset resource range of the PDCCH and that the network device has not allocated a resource to the apparatus in the second preset resource range of the PDCCH, avoid control signaling detection in the first preset resource range and the second preset resource range of the PDCCH.

7. The apparatus according to claim 6, wherein the instructions, when executed by the one or more processors, further cause the apparatus to:
receive resource range information from the network device, wherein the resource range information indicates at least one of the first preset resource range or the second preset resource range of the PDCCH.

8. The apparatus according to claim 7, wherein the resource range information is generated according to at least one of a quantity of terminals accessing the network device, types of terminals accessing the network device, service types of the terminals accessing the network device, sizes of service volumes of the terminals accessing the network device, or service transmission periods of the terminals accessing the network device.

9. The apparatus according to claim 6, wherein the first preset resource range is a dynamic scheduling resource range, and the second preset resource range is a pre-scheduling resource range.

10. The apparatus according to claim 6, wherein the scheduling information comprises dynamic scheduling information and pre-scheduling resource information, wherein the dynamic scheduling information indicates resource allocation of the dynamic scheduling resource range, and the pre-scheduling information indicates resource allocation of the pre-scheduling resource range.

11. A method, comprising:
determining, by a network device, whether control signaling is to be sent in a first preset resource range of a physical downlink control channel (PDCCH), or that control signaling is to be sent in a first preset resource range of a PDCCH;
determining, by the network device, control signaling is not to be sent in a second preset resource range of the PDCCH, wherein an available resource of the PDCCH in at least one scheduling period is divided into the first preset resource range and the second preset resource range; and
in response to determining that control signaling is to be sent in the first preset resource range of the PDCCH, and that control signaling is not to be sent in the second preset resource range of the PDCCH, sending, by the network device, scheduling information to a terminal, wherein the scheduling information indicates that the network device has allocated a resource to the terminal in the first preset resource range of the PDCCH, and that the network device has not allocated a resource to the terminal in the second preset resource range of the PDCCH; or in response to determining that control signaling is not to be sent in the first preset resource range of the PDCCH, and that control signaling is not to be sent in the second preset resource range of the PDCCH, sending, by the network device, scheduling information to a terminal, wherein the scheduling information indicates that the network device has not allocated any radio resource to the terminal in the first preset resource range and that the network device has not allocated a resource to the terminal in the second preset resource range of the PDCCH.

12. The method according to claim 11, further comprising:
sending, by the network device, resource range information to the terminal, wherein the resource range information indicates at least one of the first preset resource range or the second preset resource range of the PDCCH.

13. The method according to claim 12, further comprising:
generating, by the network device, the resource range information according to at least one of a quantity of terminals accessing the network device, types of terminals accessing the network device, service types of the terminals accessing the network device, sizes of service volumes of the terminals accessing the network device, or service transmission periods of the terminals accessing the network device.

14. The method according to claim 11, wherein the first preset resource range is a dynamic scheduling resource range, and the second preset resource range is a pre-scheduling resource range.

15. The method according to claim 14, wherein the scheduling information comprises dynamic scheduling information and pre-scheduling resource information, wherein the dynamic scheduling information indicates resource allocation of the dynamic scheduling resource range, and the pre-scheduling information indicates resource allocation of the pre-scheduling resource range.

16. An apparatus, comprising:
a non-transitory memory storage comprising instructions; and
one or more processors in communication with the memory storage, wherein the instructions, when executed by the one or more processors, cause the apparatus to:
determine whether control signaling is to be sent in a first preset resource range of a physical downlink control channel (PDCCH), or that control signaling is to be sent in a first preset resource range of a PDCCH;
determine control signaling is not to be sent in a second preset resource range of the PDCCH, wherein an available resource of the PDCCH in at least one scheduling period is divided into the first preset resource range and the second preset resource range; and
in response to determining that control signaling is to be sent in the first preset resource range of the PDCCH, and that control signaling is not to be sent in the second preset resource range of the PDCCH, send scheduling information to a terminal, wherein the scheduling information indicates that a network device has allocated a resource to the terminal in the first preset resource range of the PDCCH, and that the network device has not allocated a resource to the terminal in the second preset resource range of the PDCCH; or
in response to determining that control signaling is not to be sent in the first preset resource range of the PDCCH, and that control signaling is not to be sent in the second preset resource range of the PDCCH, send scheduling information to a terminal, wherein the scheduling information indicates that the network device has not allocated any radio resource to the terminal in the first preset resource range and that the network device has not allocated a resource to the terminal in the second preset resource range of the PDCCH.

17. The apparatus according to claim 16, wherein the instructions, when executed by the one or more processors, further cause the apparatus to:

send resource range information to the terminal, wherein the resource range information indicates at least one of the first preset resource range or the second preset resource range of the PDCCH.

18. The apparatus according to claim 17, wherein the instructions, when executed by the one or more processors, further cause the apparatus to:

generate the resource range information according to at least one of a quantity of terminals accessing the network device, types of terminals accessing the network device, service types of the terminals accessing the network device, sizes of service volumes of the terminals accessing the network device, or service transmission periods of the terminals accessing the network device.

19. The apparatus according to claim 16, wherein the first preset resource range is a dynamic scheduling resource range, and the second preset resource range is a pre-scheduling resource range.

20. The apparatus according to claim 19, wherein the scheduling information comprises dynamic scheduling information and pre-scheduling resource information, wherein the dynamic scheduling information indicates resource allocation of the dynamic scheduling resource range, and the pre-scheduling information indicates resource allocation of the pre-scheduling resource range.

* * * * *

UNITED STATES PATENT AND TRADEMARK OFFICE
CERTIFICATE OF CORRECTION

PATENT NO. : 11,134,512 B2
APPLICATION NO. : 15/991587
DATED : September 28, 2021
INVENTOR(S) : Shulan Feng Page 1 of 1

It is certified that error appears in the above-identified patent and that said Letters Patent is hereby corrected as shown below:

In the Claims

Claim 1, Column 23, Line 63; insert --a-- in between "in" and "first".

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*